T857,027

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 695

592,761

PROCESS FOR COMPRESSION CYCLE EXERCISING OF A POROUS, BONDED FIBER STRUCTURE AND PRODUCT THEREBY

John Gerard Lavin, Wynnewood, Wilmington, Del., assignor to E. I. du Pont de Nemours and Company, Wilmington, Del., a corporation of Delaware Filed Nov. 8, 1966. Published Dec. 17, 1968

Class 161—157

No Drawing. 13 Pages Specification

A process for improving the durability and aesthetics of bonded, porous, low density structures (e.g., cushion and fillers for pillows or sleeping bags) comprised of crimped fibers (preferably substantially parallelized in one direction) which are attached at a plurality of contact points (preferably by a binder material) and the improved product is disclosed. The structure is exercised, e.g., by cyclical platen compression or a cyclical roller compression, for a sufficient number of cycles to provide an improvement in height retention and load support. Preferred embodiments specify a total of more than 1,000 cycles (most preferably 4,000 to 8,000), an exercising temperature of room temperature or above, an exercising load of at least 2 pounds per square inch (most preferably 2 to 4), and/or a cycle rate of 10,000 to 40,000 cycles/hour.